United States Patent
Morad et al.

(10) Patent No.: US 11,494,199 B2
(45) Date of Patent: Nov. 8, 2022

(54) KNOB REFINEMENT TECHNIQUES

(71) Applicant: Synopsys, Inc., Mountain View, CA (US)

(72) Inventors: Tomer Morad, New York, NY (US); Omer Yehezkely, Kadima (IL); Tomer Paz, Petah Tikva (IL); Andrey Gelman, Haifa (IL); Michael Tseitlin, Rehovot (IL)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/191,389

(22) Filed: Mar. 3, 2021

(65) Prior Publication Data
US 2021/0279078 A1   Sep. 9, 2021

Related U.S. Application Data

(60) Provisional application No. 62/984,855, filed on Mar. 4, 2020.

(51) Int. Cl.
*G06F 9/44*     (2018.01)
*G06F 9/445*    (2018.01)
*G06F 7/08*     (2006.01)

(52) U.S. Cl.
CPC ............ *G06F 9/44505* (2013.01); *G06F 7/08* (2013.01)

(58) Field of Classification Search
CPC .................. G06F 1/32; G06F 9/44; G06F 1/12
See application file for complete search history.

(56) References Cited

U.S. PATENT DOCUMENTS

| | | | |
|---|---|---|---|
| 9,342,129 B2 * | 5/2016 | Mukherjee | G06F 1/3203 |
| 2014/0189564 A1 * | 7/2014 | Ohno | G06F 3/04895 |
| | | | 715/771 |
| 2016/0110657 A1 | 4/2016 | Gibiansky et al. | |
| 2017/0242472 A1 * | 8/2017 | Morad | G06F 1/3206 |
| 2019/0294127 A1 * | 9/2019 | Maegawa | C30B 15/22 |

OTHER PUBLICATIONS

Cardoso et al., "Code Retargeting for CPU-based Platforms" Embedded Computing for High Performance, 2017.

\* cited by examiner

*Primary Examiner* — Keshab R Pandey
(74) *Attorney, Agent, or Firm* — Fenwick & West LLP

(57) ABSTRACT

A system and method for knob refinement. A method includes determining an ordered list of knobs organized with respect to impact on the target metric for a system based on a plurality of historical sets of target metric measurements; determining a second system configuration based on the ordered list of knobs and a first set of target metric measurements recorded for the system when the system is configured according to a first system configuration, the system having a plurality of knobs, wherein the second system configuration includes at least one knob of the plurality of knobs that is reconfigured as compared to the first system configuration; and applying one of the first system configuration and the second system configuration, wherein the applied system configuration is determined based on the first set of target metric measurements and a second set of target metric measurements.

20 Claims, 4 Drawing Sheets

KNOB REFINEMENT TECHNIQUES

CROSS-REFERENCE TO RELATED APPLICATIONS

This application claims the benefit of U.S. Provisional Application No. 62/984,855 filed on Mar. 4, 2020, the contents of which are hereby incorporated by reference.

TECHNICAL FIELD

The present disclosure relates generally to tuning of system parameters for optimal performance.

BACKGROUND

During the process of optimizing computer performance, adjusting the configuration of knobs used by the computer can greatly affect the resulting performance. For example, when compiling software for a computer, the selection of compiler flags may particularly affect resulting performance. Suitable compiler flag selections may be identified in a process known as compiler flag mining. Compiler flag mining is a process of matching compiler flags with an application and the computer system it runs on to achieve the best performance.

Existing solutions for configuration tuning include manual selection of knob values by a human operator. This approach is impractical due to the number of possible configurations of the knobs and their values which may need to be considered. Further, when tuning is performed continuously as frequent changes are made, manually re-selecting of configuration parameters becomes impossible for the human operator.

Other existing solutions may include configuring knobs based on known information about the system being tuned. However, these approaches are inflexible and do not account for differences among hardware-software combinations among systems used for different applications. The result is that these configurations are determined based on predetermined "typical" conditions instead of actual performance variability. Thus, these approaches do not always yield truly optimal performance.

Existing automated solutions for configuration tuning use algorithms that quickly explore the space of possible configurations, searching for a configuration that is near-optimal with regard to a desired performance metric.

Configurations that are a result of a manual or automated search usually include a large set of knob values that are different from the baseline configuration. Some of these knob values contribute to the performance metric, but many of them might not have significant influence and could be left at their baseline values. Having many knobs whose values are different from baseline is undesirable. One of the reasons why this is undesirable is that it increases the validation time required to ensure that the configuration works correctly. Another reason is that system operators can generate insights from having only a short list of influential knobs.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for knob refinement. The method comprises: determining an ordered list of knobs for a system based on a plurality of historical sets of target metric measurements related to a target metric, wherein the ordered list of knobs is organized with respect to impact on the target metric; determining a second system configuration based on the ordered list of knobs and a first set of target metric measurements, wherein the first set of target metric measurements is recorded for the system when the system is configured according to a first system configuration, the system having a plurality of knobs, wherein each knob is a system parameter of the system, wherein the first system configuration defines a configuration for each of the plurality of knobs, wherein the second system configuration includes at least one knob of the plurality of knobs that is reconfigured as compared to the first system configuration; and applying one of the first system configuration and the second system configuration, wherein the applied system configuration is determined based on the first set of target metric measurements and a second set of target metric measurements, wherein the second set of target metric measurements is recorded for the system when the system is configured according to the second system configuration.

Certain embodiments disclosed herein also include a non-transitory computer readable medium having stored thereon causing a processing circuitry to execute a process, the process comprising: determining an ordered list of knobs for a system based on a plurality of historical sets of target metric measurements related to a target metric, wherein the ordered list of knobs is organized with respect to impact on the target metric; determining a second system configuration based on the ordered list of knobs and a first set of target metric measurements, wherein the first set of target metric measurements is recorded for the system when the system is configured according to a first system configuration, the system having a plurality of knobs, wherein each knob is a system parameter of the system, wherein the first system configuration defines a configuration for each of the plurality of knobs, wherein the second system configuration includes at least one knob of the plurality of knobs that is reconfigured as compared to the first system configuration; and applying one of the first system configuration and the second system configuration, wherein the applied system configuration is determined based on the first set of target metric measurements and a second set of target metric measurements, wherein the second set of target metric measurements is recorded for the system when the system is configured according to the second system configuration.

Certain embodiments disclosed herein also include a system for knob refinement. The system comprises: a processing circuitry; and a memory, the memory containing instructions that, when executed by the processing circuitry, configure the system to: determine an ordered list of knobs for a system based on a plurality of historical sets of target metric measurements related to a target metric, wherein the ordered list of knobs is organized with respect to impact on the target metric; determine a second system configuration based on the ordered list of knobs and a first set of target metric measurements, wherein the first set of target metric measurements is recorded for the system when the system is configured according to a first system configuration, the system having a plurality of knobs, wherein each knob is a system parameter of the system, wherein the first system configuration defines a configuration for each of the plurality of knobs, wherein the second system configuration includes at least one knob of the plurality of knobs that is reconfigured as compared to the first system configuration; and apply one of the first system configuration and the second system configuration, wherein the applied system configuration is determined based on the first set of target metric measurements and a second set of target metric measurements, wherein the second set of target metric measurements is recorded for the system when the system is configured according to the second system configuration.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
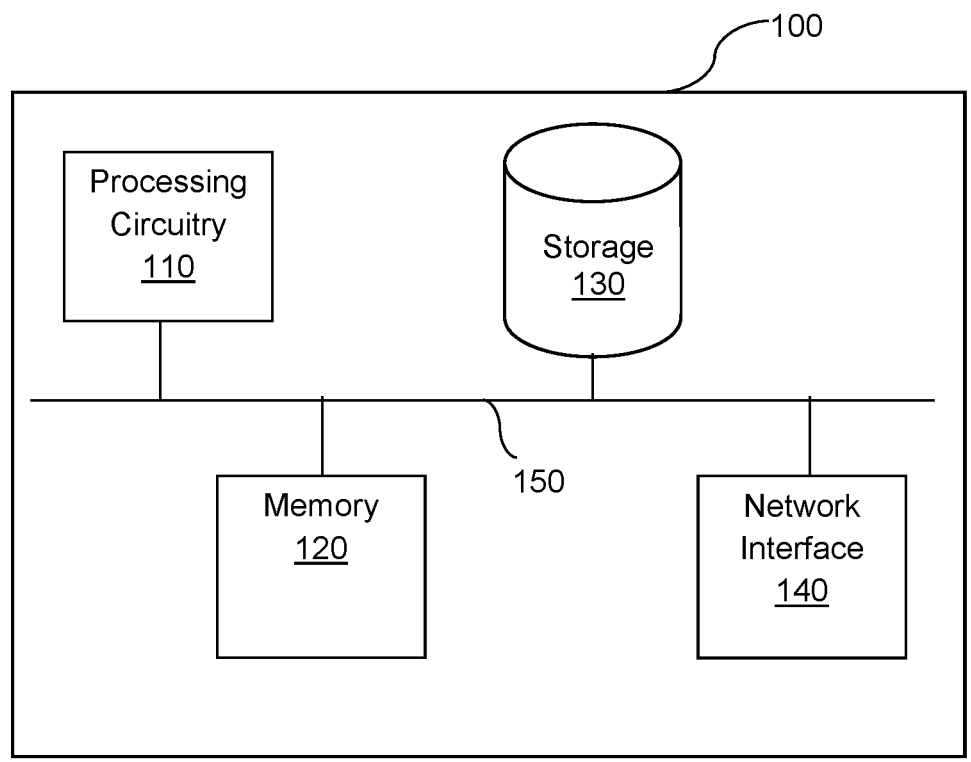
FIG. 1 is a schematic diagram of a knob refiner according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Due to the above limitations of the large number of knobs with values that are different from baseline which may be the result of any given optimization process, a solution for post-processing refinement of knobs which optimizes knob configurations with respect to a target metric are desirable. To this end, the disclosed embodiments provide techniques for knob refinement which allow for identifying and trimming knobs whose values differ from their baseline values, and which have minimal impact on the optimization target metric.

In this regard, it has been further identified that many knobs do not have a significant impact on the target metric (for example, but not limited to, power, system performance, energy per instruction, etc.) such that, when ordered according to expected effect on such a target metric, generally only the top few knobs actually need to be reconfigured for optimal performance. Accordingly, the disclosed embodiments provide techniques for efficiently and effectively identifying which knobs need to be reconfigured.

More specifically, optimization algorithms, such as genetic algorithms and Bayesian algorithms, search the parameter space by changing many knob values at once. This results in a long list of knobs that are different than baseline in the optimized configuration. In most scenarios, there is a relatively small subset of the changed knobs which, after smart tuning, can achieve optimal performance. This means that optimal performance can be achieved by altering only a few knobs while leaving the majority of the knobs in their baseline values. Such a minimal-optimal configuration is beneficial because it minimizes the work needed for optimizing the system and it may help in better understanding of the system and its bottlenecks.

The disclosed embodiments include techniques for knob refinement. The knobs are parameters which may affect performance of a system such that the knobs can be tuned in order to optimize system performance, power, or any other target metric. In an embodiment, a system is run a first time with each knob configured according to an original configuration such as, but not limited to, a previously discovered optimized configuration, a baseline, or other prior configuration. A first set of target metric measurements is recorded based on the operation of the system in the first configuration.

Based on the target metric measurements of the first configuration, the knobs are organized into an ordered list. The ordered list of knobs is divided into portions. A first portion is configured according to a potentially optimized configuration while a second portion is configured according to the original baseline configuration. The system is run a second time using the newly configured portions of knobs and a second set of target metric measurements is recorded.

The results of the first and second sets of target metric measurements are compared to determine whether the newly configured knobs yield approximately the same or better results as the prior configuration of knobs. If so, it is determined that the potentially optimized configuration will not optimize the target metric and therefore the knobs can be configured according to the prior configuration, thereby refining the knob configuration. Otherwise, it is determined that the potentially optimized configuration at least optimizes the target metric with respect to the first portion of knobs and therefore the first portion of knobs should be configured according to the potentially optimized configuration.

In a further embodiment, the knobs may be further refined by iteratively performing the process between an originally selected configuration and new potentially further refined configurations. More specifically, once the first portion of knobs is reconfigured, the first or second portion may be further subdivided into two sub-portions and analyzed as described above to determine whether one of the sub-portions can be further refined. Such iterative knob refinement allows for making minimal changes to knob configuration as compared to a baseline configuration while optimizing the performance of the system.

In an embodiment, in order to discern between influential and non-influential knobs, a score is assigned to each knob according to its estimated influence during the optimization phase. The knobs are organized into the ordered list based on the scores, e.g., from highest to lowest score. Organizing the knobs based on scores representing degrees of estimated influence allows for objectively and more accurately identifying the most influential and least influential knobs, which allows for dividing the knobs, for example, into two portions, where the first portion represents the most influential knobs and the second portion represents the least influential knobs. This, in turn, allows for focusing knob refinement on the knobs which are most likely to have a significant impact on the target metric and therefore yields an optimized system configuration more efficiently as compared to refinement involving reconfiguring each knob individually at each iteration.

FIG. 1 is an example schematic diagram of a knob refiner 100 according to an embodiment. The knob refiner 100 includes a processing circuitry 110 coupled to a memory 120, a storage 130, and a network interface 140. In an embodiment, the components of the knob refiner 100 may be communicatively connected via a bus 150.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 120 may be volatile (e.g., random access memory, etc.), non-volatile (e.g., read only memory, flash memory, etc.), or a combination thereof.

In one configuration, software for implementing one or more embodiments disclosed herein may be stored in the storage 130. In another configuration, the memory 120 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 110, cause the processing circuitry 110 to perform the various processes described herein.

The storage 130 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

It should be understood that the embodiments described herein are not limited to the specific architecture illustrated in FIG. 1, and other architectures may be equally used without departing from the scope of the disclosed embodiments.

It should also be noted that various disclosed embodiments are described with respect to a system which is configured to self-tune, i.e., such that the system which performs the disclosed knob refinement is the system to be optimized. However, in other implementations, the knob refiner 100 may be an external system which is configured to perform knob refinement as described herein with respect to another system. In such implementations, the knob refiner 100 may be further configured with an interface (e.g., a network interface, not shown) for communicating with the system to be optimized. The knob refiner 100 may send commands for reconfiguring knobs and may receive resulting target metric measurements via such interface.

Figure 2:
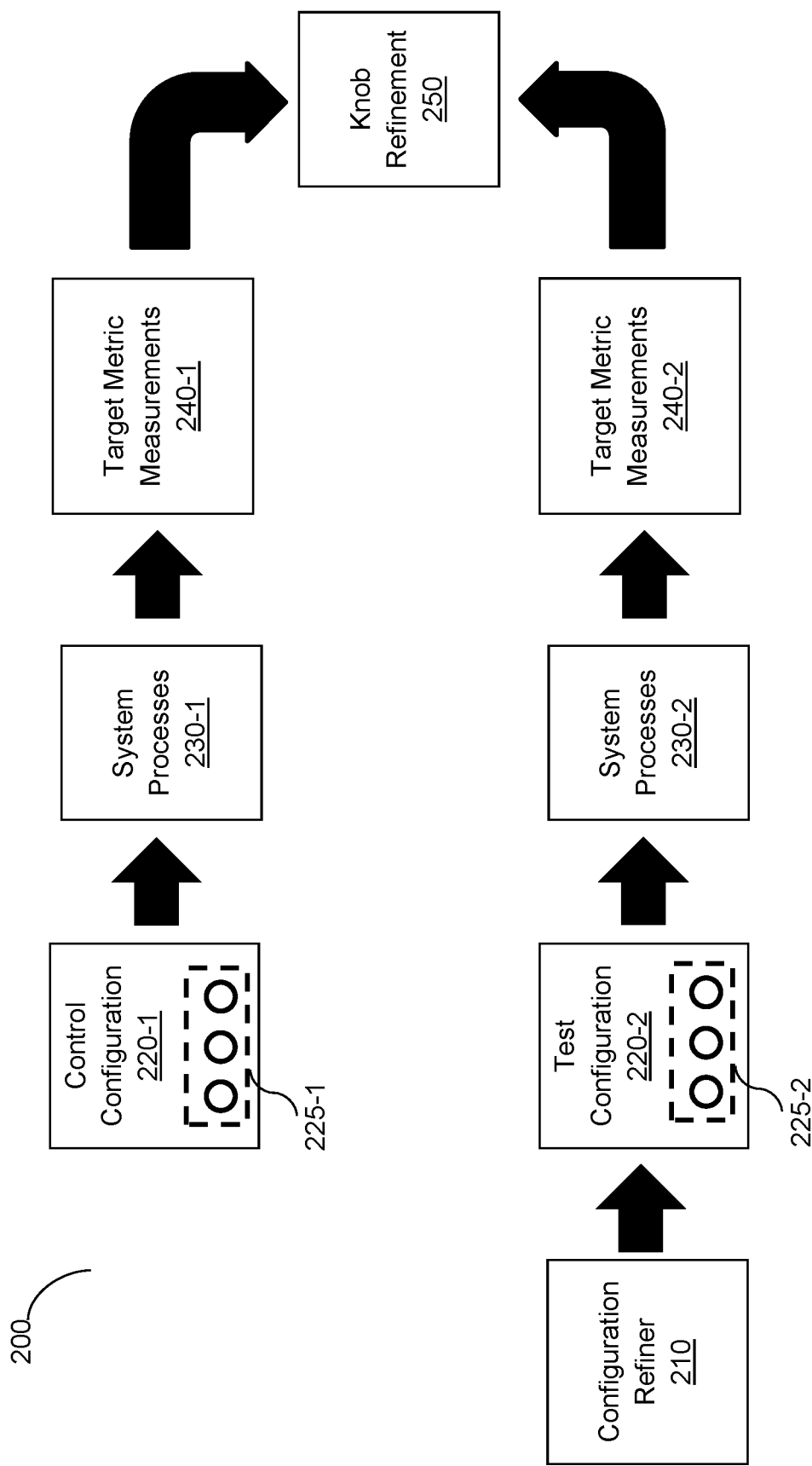
FIG. 2 is a flow diagram illustrating logical components of the knob refiner according to an embodiment.

FIG. 2 is an example flow diagram 200 illustrating logical components of the knob refiner according to an embodiment.

In the flow diagram 200, the target metric is measured twice: once using a control configuration 220-1, and another time using a test configuration 220-2. Each of the control configuration 220-1 and the test configuration 220-2 includes respective knobs 225-1 and 225-2.

As noted above, the knobs 225-1 and 225-2 are system parameters that may affect the target metric of the system. The knobs 225-1 and 225-2 (also referred to as "system knobs") may include, but are not limited to, hardware configuration parameters, processor configuration parameters, firmware configuration parameters, operating system (OS) configuration parameters, application configuration parameters, compiler flags, virtual machine configuration parameters, container configuration parameters, orchestration configuration parameters, data center configuration parameters and any other parameter that can influence the behavior or metric of the system. A non-limiting example list of knobs includes parameters indicating whether to enable symmetric multithreading on CPUs, whether to enable CPU cache prefetchers, whether to use a specific version of CPU microcode, whether to limit the power states of a power management unit of a CPU, which IO scheduler to use in the OS, which task scheduler to use in the OS, the OS scheduler time interval, task affinities, the hardware timer event interval, the maximum network packet size, the maximum threads a web server software can spawn, the voltage and frequency of a core, which compiler flags to use for building the binaries, which container sizes to use, whether to enable or disable a certain software performance feature, and so on.

The control configuration 220-1 is the configuration according to a potentially optimized configuration as described herein, and is used as a point of comparison for the test configuration 220-2. Such a potentially optimized configuration may be determined using one or more system optimization processes (not shown) such as, but not limited to, a genetic algorithm, a Bayesian algorithm, manual tuning, and the like. The test configuration 220-2 includes a portion of the knobs 225-2 that is configured according to a potentially refined configuration as described herein. Such a potentially refined configuration may be determined via a configuration refiner 210 using one or more knob selection algorithms (not shown) such as, binary search, greedy search, and the like. In an example implementation, when the process is performed iteratively, the control configuration 220-1 is the same at each iteration, and a new test configuration 220-2 may be used at each iteration.

Altering the configuration of the knobs 225-1 and 225-2 affects the target metric via respective system processes 230-1 and 230-2. Such system processes 230-1 and 230-2 may include, but are not limited to, hardware operations, firmware operations, execution of operating system software, execution of application software, execution of virtual machines, simulation of operations, mathematical functions, machine learning models, combinations thereof, and the like.

The results of the system processes 230 using their respective configurations 220 are recorded as respective target metric measurements 240-1 and 240-2. Such target metric measurements 240 relate to target metrics, which are measurable characteristic related to system operation. Target metrics may include, but are not limited to, execution time, response time, latency, throughput, machine learning model accuracy, mathematical function result, number of retired instructions of a processor, average power consumption, maximum power consumption, energy consumption, combinations thereof, and the like.

Based on the results of the target metric measurements 240-1 and 240-2, knob refinement 250 is performed. The knob refinement 250 includes determining whether the modification to a portion of the knobs 225-2 results in similar or improved values of the target metric and, if so, tuning knobs of the system in accordance with the test configuration 220-2. Otherwise, the knobs should be configured in accordance with the control configuration 220-1. Values of a target metric may be similar when, for example, a second value is within a predetermined number (e.g., 1) of standard deviations of a first value.

In some implementations, the flow depicted in FIG. 2 may be iteratively repeated. For example, when the system is configured in accordance with the system configuration 220-2, that configuration may be used as the control configuration 220-1 for a subsequent iteration and further configuration refinement may be performed in order to determine a new test configuration 220-2. In other implementations, when the system is configured in accordance with the system configuration 220-2, another portion of the knobs may be chosen for the knobs 225-2. In an embodiment, the other portion of the knobs may be chosen using a binary search, where the list of knobs is divided into two halves. In the first iteration, the least influential half is reset to baseline and the most influential half is reconfigured according to the control configuration 220-1. If the knob refinement 250 results in determining that the refined configuration 220-2 should be used, then the most influential half is further subdivided into two halves. Otherwise, the least influential half is further subdivided into two halves. The process continues iteratively until no further divisions are possible (e.g., when only a single knob is left in the most recent subdivision).

It should be noted that the flow shown in FIG. 2 depicts knob refinement occurring after an optimization process for simplicity purposes, but that the knob refinement may occur as part of an optimization process without departing from the scope of the disclosed embodiments. Invoking knob refinement as described herein during the optimization process allows for reducing the number of knobs that must be considered during the optimization process. To this end, in such an implementation, an ordered list of knobs may be generated as described below during the optimization process, and the optimization process may only include attempting to optimize a portion of knobs having the greatest impact among the knobs (e.g., as determined based on their placement within the ordered list of knobs).

Figure 3:
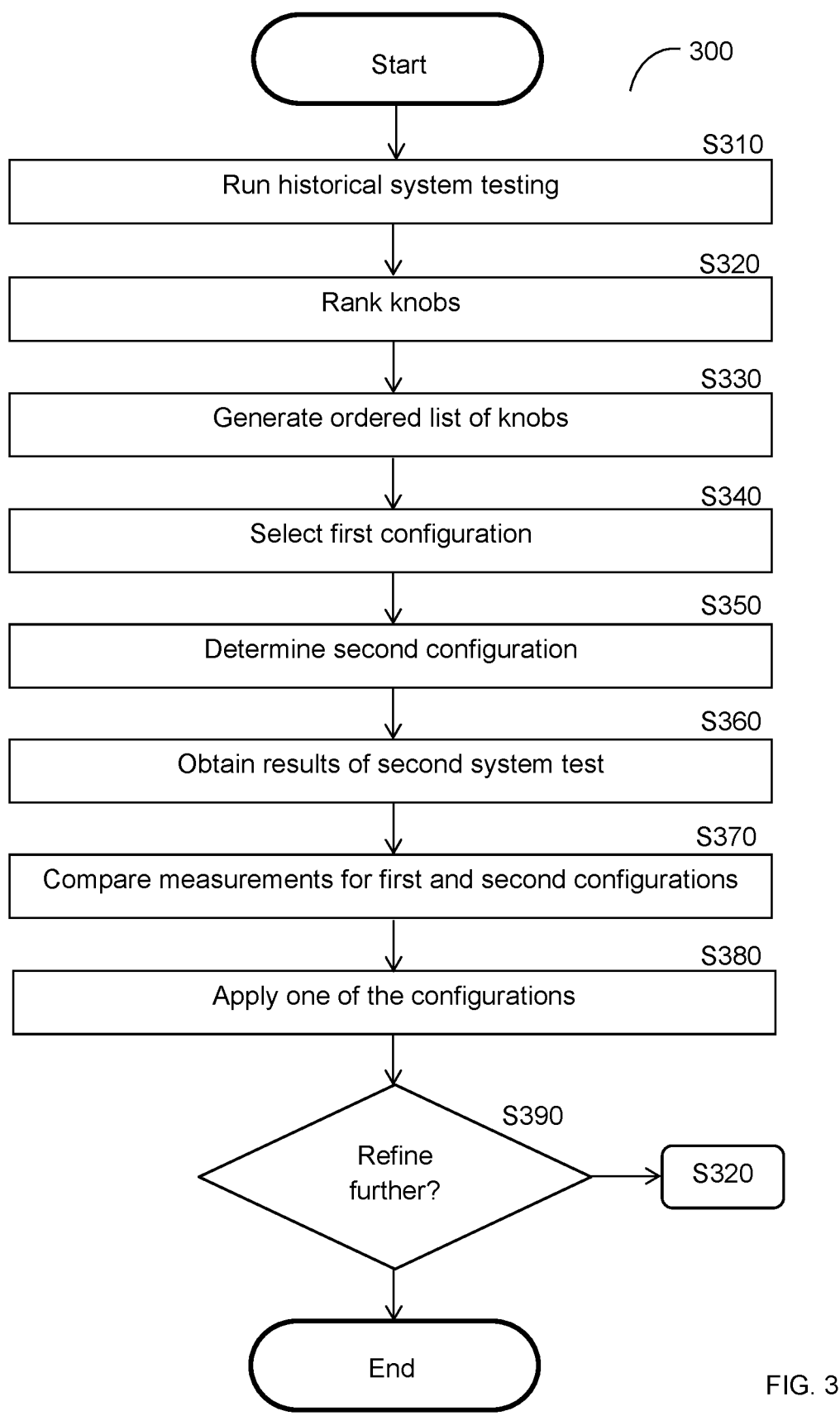
FIG. 3 is a flowchart illustrating a method for knob refinement according to an embodiment.

FIG. 3 is an example flowchart 300 illustrating a method for knob refinement according to an embodiment. In an embodiment, the method is performed by the knob refiner 100, FIG. 1.

At S310, historical system testing is performed using multiple historical system configurations. Each historical system configuration includes a respective configuration for each knob considered for refinement.

At S320, based on the historical system testing, the knobs are ranked with respect to impact on the target metric. In an embodiment, S320 may include generating scores which each represents a degree to which its respective knob impacts a target metric. In an embodiment, the scores are generated based on the history of samples made on the system. In another embodiment, more than one sample may have been measured for a given configuration. In that case, a point estimator is used to estimate the target metric of a configuration. The point estimator can be estimated by, for example, calculating an average of the samples, a percentile, mode, maximum, minimum, and the like.

In an embodiment, the knobs may be ranked in accordance with the following definitions and pseudocode. In this embodiment, S is a sorted array of n pairs, where each pair among S contains a knobs configuration (i.e., a configuration of the knobs of the system) and its respective associated target metric measurement (i.e., a target metric recorded when the system is configured in accordance with the knobs configuration). In an example implementation, the $i^{th}$ knobs configuration may be accessed using a function named "S[i].conf" and its associated target metric may be accessed using a function named "S[i].perf."

Each knob configuration is an array of m pairs, where each pair among m includes a knob name and an associated state. In an example implementation, the $j^{th}$ knob name of the $j^{th}$ knobs configuration may be accessed using "S[i].conf[j].name" and its associated state may be accessed using "S[i].conf[j].state." All knob configurations are sorted by the same order of knob names.

In a further embodiment, the sorted array of pairs S is sorted by ascending or descending order of target metric measurements (i.e., based on the target metric measurement of each pair). In this example implementation, it is assumed that S contains at least 2 knob configurations and their associated target metric measurements.

A tolerance threshold c defines a deviation ratio from a given target metric measurement which will be treated as similar, i.e., essentially the same performance. In an example implementation, the value for the tolerance threshold c is 0.0005.

A hash map R maps a knob's name to a penalty score associated with that knob. In an example implementation, for a given knob A, the penalty score may be accessed using "R[A]." It is assumed that, given penalty scores for 2 knobs, the knob with the higher score is likely to be less influential on the target metric than the knob with the lower score.

In a non-limiting example implementation, the ranking may be performed using an algorithm in accordance with the following pseudocode based on the definitions provided in the immediately preceding paragraphs.

```
1    RANK(S, n, m, ε, R)
2        R ← 0
3        For i ← 1..n
4            j ← NEAREST(S, n, i)
5            If ABS(S[i].perf – S[j].perf) / ABS(S[i].perf) < ε
6                PENALIZE(S, i, j, m, R)
1    NEAREST(S, n, i)
2        If i = 1
3            Return 2
4        If i = n
5            Return i – 1
6        prev ← S[i – 1].perf
7        next ← S[i + 1].perf
8        If ABS(S[i].perf – prev) < ABS(S[i].perf - next)
9            Return i – 1
10       Return i + 1
1    PENALIZE(S, i, j, m, R)
2        For k <– 1..m
3            If S[i].conf[k].state ≠ S[j].conf[k].state
4                R[S[i].conf[k].name] ← R[S[i].conf[k].name] + 1
1    ABS(n)
2        If n < 0
3            Return (–n)
4        Return n
```

The above "PENALIZE" function assigns, to each applicable knob, a predetermined penalty score of 1. In an alternative implementation, the penalty value PV may be determined, for example, in accordance with equation 1:

$$PV=(\varepsilon-(ABS(S[i].\text{perf}-S[j].\text{perf})/ABS(S[i].\text{perf})))/\varepsilon \quad \text{Equation 1}$$

The penalty value PV, as defined according to Equation 1, will be 1 if $S[i].\text{perf}=S[j].\text{perf}$, i.e., if the target metric measurement for the $i^{th}$ knob configuration is equal to the target metric measurement for the $j^{th}$ knob configuration. The penalty value PV approaches 0 as the difference between $S[i].\text{perf}$ and $S[j].\text{perf}$ increases. It is noted that, due to the limitation imposed by using the tolerance threshold $\varepsilon$, the ratio: $ABS(S[i].\text{perf}-S[j].\text{perf})/ABS(S[i].\text{perf})$ cannot exceed $\varepsilon$.

Alternatively, the penalty value PV may be determined based on the difference between $S[i].\text{perf}$ and a target metric measurement of a known optimized knobs configuration. In such an implementation, smaller distances between $S[i].\text{perf}$ and the target metric measurement of a known optimized knobs configuration will result in higher penalty values PV (and, therefore, higher penalties to the ranking of the respective knobs) because the likelihood that a given knob significantly affects the target metric decreases as the difference between the target metric measurement under the $i^{th}$ knob configuration and under the known optimized knob configuration is smaller.

In an alternative embodiment, the knobs may be ranked in accordance with the following definitions and algorithm:

Definitions $$C=(c_1=v_1, c_2=v_2, \ldots, c_m=v_m)$$

$$\text{CoVal}_i(C)=v_i$$

$$S=\{s_1, s_2, \ldots, s_n\}$$

$$\text{Conf}_i(s)=\text{CoVal}_i(\text{Con}(s))$$

$$\text{Dist}(s_i, s_j)=\{c_x|\text{Conf}_x(s_i)\neq \text{Conf}_x(s_j)\}$$

In the above definitions, C is the knobs configuration, m is the total number of knobs being refined, $c_i$ is an identifier of a knob, $v_i$ is a value of a knob, $\text{CoVal}_i(C)$ is the value of a knob i under configuration C, S is a set of n workload samples s each having a distinct configuration of knobs Con(s) and a corresponding target metric measurement for that distinct configuration, Val(s) is the target metric value of a sample s, Abs(x) is the absolute value of x, $\varepsilon$ is an acceptable ratio threshold, and $\text{Dist}(s_i,s_j)$ is the distance set of samples $s_i$ and $s_j$ that includes the knobs that differ between $\text{Con}(s_i)$ and $\text{Con}(s_j)$, and Res is a results hash map such that $\text{Res}(c_k)$ is the corresponding entry for the knob $c_k$ in the results hash map. In an example implementation, the acceptable ratio threshold E is 0.0005 such that only ratios between 0 and 0.0005 are considered to be acceptable. The results hash map may be initialized to 0 (i.e., a null or empty value).

Each workload samples of the set S of workload samples corresponds to a respective set of historical target metric measurements recorded when a system is configured according to its respective distinct configuration. The set of target metric measurements for each workload sample s includes a target metric value Val(s) used to determine ratio thresholds between workload samples s.

Given a set of n workload samples $S=\{s_1, s_2, \ldots, s_n\}$, for each $1\leq i\leq n$, find j such that $j\neq i$, $1\leq j\leq n$, and $\text{Abs}(\text{Val}(s_i)-\text{Val}(s_j))$ is minimized (e.g., such that the distance between the workload samples $s_i$ and $s_j$ is lowest among all values of j for which $j\neq i$ and $1\leq j\leq n$). If $$\frac{\text{Abs}(\text{Val}(s_i)-\text{Val}(s_j))}{\text{Abs}(\text{Val}(s_i))}<\varepsilon,$$

add a compensator value to each $\text{Res}(c_k)$ such that $c_k\in\text{Dist}(s_i,s_j)$. In an embodiment, the compensator value is 1. In another embodiment, the compensator value may be determined based on $\text{Val}(s_i)$, $\text{Val}(s_j)$, and $\varepsilon$. In a further embodiment, the compensator value F is determined using the following equation:

$$F=\left(\varepsilon-\frac{\text{Abs}(\text{Val}(s_i)-\text{Val}(s_j))}{\text{Abs}(\text{Val}(s_i))}\right)/\varepsilon \quad \text{Equation 1}$$

In an embodiment, the speedups of different configurations applied prior to performing knob refinement may be used in determining the score for each knob.

The result of the above is a set of values Res which represents the ranking of knobs based on scores. Knobs with higher scores calculated as described above are less likely to be influential than knobs with lower scores such that knobs with relatively low scores are likely to significantly impact target metrics.

At S330, based on the ranking, an ordered list of knobs is generated. The ordered list of knobs may be determined based on the ranking. In the example noted above, the knobs may be ordered from highest score to lowest score such that the first entries in the list are those with the least impact on the target metric and the last entries in the list are those with the most impact on the target metric.

At S340, a first system configuration is selected for use as a control configuration to be compared to a test configuration. The control configuration may be, but is not limited to, the optimal configuration achieved in the optimization step, a baseline configuration, a configuration from a previous iteration of knob refinement, and the like. Such a baseline configuration may include a default configuration for each knob. The first system test includes running the system (which includes, but is not limited to, initiating hardware components and executing applications or other software components) and recording the target metric measurements related to different aspects of the system. The control configuration may be selected from among the historical system configurations or may be determined, for example, based on the ordered list of knobs.

At S350, second system configuration is determined. The second system configuration acts as a test configuration whose effect on the target metric is compared to the first system configuration.

In an embodiment, S350 may include reconfiguring at least a portion of the knobs in accordance with the determined second system configuration. In a further embodiment, the portion of the knobs to be reconfigured is a portion of the knobs having the lowest impact on the target metric. In an example implementation, the knobs may be divided into two halves based on the ordered list such that one half includes the knobs having the greatest impact on the target metric and the other half includes the knobs having the least impact on the target metric. In an embodiment, the portion of knobs having the greatest impact on the target metric is reconfigured.

At S360, results of a second system test of the system using a second system configuration are obtained. The second system configuration includes the reconfigured portion of the knobs as well as a portion of the knobs which was not reconfigured since the first system test. Target metric measurements are recorded for the second system test.

In an embodiment, S360 includes running a second system test for the system configured according to the second system configuration. Alternatively or in combination, S360 may further include checking whether historical target metric measurements for the system configured in accordance with the second system configuration are available (e.g., in a database). More specifically, it may be checked whether a set of historical target metric measurements for the system having the knobs configured in accordance with the second system configuration are available and, if so, retrieving such historical target metric measurements; otherwise, the second system test is run. Checking for historical measurements before running a system test conserves computing resources that would otherwise need to be utilized to run the system and measure the target metric.

In a further embodiment, S360 may further include storing results of the second system test as a set of historical target metric measurements in a database (e.g., the storage 130, FIG. 1) for subsequent use (e.g., using historical results instead of performing further testing as described above with respect to S350). The historical target metric measurements may be stored alongside corresponding data describing the second system configuration, thereby allowing for checking whether historical measurements for a given configuration are available.

At S370, results of the first system test and the second system test are compared. In an embodiment, S370 includes determining whether the second configuration results in similar or improved values for the target metric as compared to the first configuration. To this end, S370 may include applying one or more improvement rules defining whether one system configuration improves performance as compared to another system configuration.

The improvement rules are applied to the respective target metric measurements of the compared system configurations. The improvement rules may define a specific target metric that is desirable to optimize (i.e., such that the configuration which has the better value for this target metric measurement is determined to have similar or improved values for a target metric as compared to the other system configuration), or may include rules accounting for multiple target metrics which are desirable to improve. To this end, the improvement rules may further define a weighted scoring system to be used for comparing target metric measurements by determining an aggregated score for various target metric measurements.

In some implementations, a second configuration might be considered as optimized as compared to a first configuration even if values of the target metric are below values of the target metric of the first configuration by a certain threshold.

In an embodiment, the threshold is a predetermined value which remains constant throughout any iterations. In another embodiment, the threshold may be determined based on the standard deviation of the samples of the configurations.

At S380, based on the comparison at S370, one of the system configurations is applied to the system. In an embodiment, the second system configuration is applied when the second system configuration results in similar or improved values of the target metric as compared to the first system configuration. Which system configuration to apply is determined based on the respective target metric measurements during the first and second system tests.

Since only a portion of knobs which likely have the most significant impact on the target metric are actually reconfigured according to the second system configuration, the process of knob refinement results in an optimal system configuration which requires a minimal number of reconfigured knobs. As a result, a system having the refined knob configuration is easy to deploy. Further, testing portions of the knobs allows for collecting more granular data about knob impacts on the target metric, which in turn can be used to better tune the system.

At S390, it is determined whether further refinement should be performed and, if so, execution continues with S320 using the results of the second system test to generate scores for the knobs.

In an embodiment, during the next iteration, the knobs which were reconfigured at S350 are treated as finalized and only the remaining knobs (i.e., the knobs which were not reconfigured at S350 during this iteration) are subject to the knob refinement process. Thus, in such an embodiment, the method is iterated until a configuration is determined for each knob. As a non-limiting example, during a first iteration, 8 knobs are refined, such that the configuration which is kept includes 4 knobs having a new baseline configuration and 4 knobs having an optimized configuration. During a second iteration, the 4 knobs having the optimized configuration are organized into two sets of 2 knobs and one of the sets is reconfigured back to the baseline configuration. During a third iteration, the set of 2 knobs which was not reconfigured is organized into two sets of 1 knob each and refined again. When the final iteration is completed, all knobs will have been refined such that each knob is reconfigured according to the baseline configuration if such reconfiguration of the knobs retains or improves the target metric.

In yet another embodiment, the knobs are first filtered using their scores (e.g., such that only knobs having a score below a threshold are reconfigured), and the knobs are then evaluated individually through iteration in order to determine each reconfigured knob's impact on the target metric.

In another embodiment, the reconfigured knobs are iterated one-by-one in order to determine the contribution of each reconfigured knob to optimizing the target metric. In such an embodiment, each iteration involves reconfiguring one of the knobs according to its baseline configuration (i.e., the configuration of that knob in the baseline configuration) and iterating testing using the knobs configuration with only the single reconfigured knob as the test system configuration. After each iteration, if the new configuration retains or improves performance, the new configuration is applied as the configuration for the next iteration. When all iterations are completed, the final resulting configuration (i.e., the configuration determined at the last iteration) is applied to the system in order to optimize the target metric.

Figure 4:
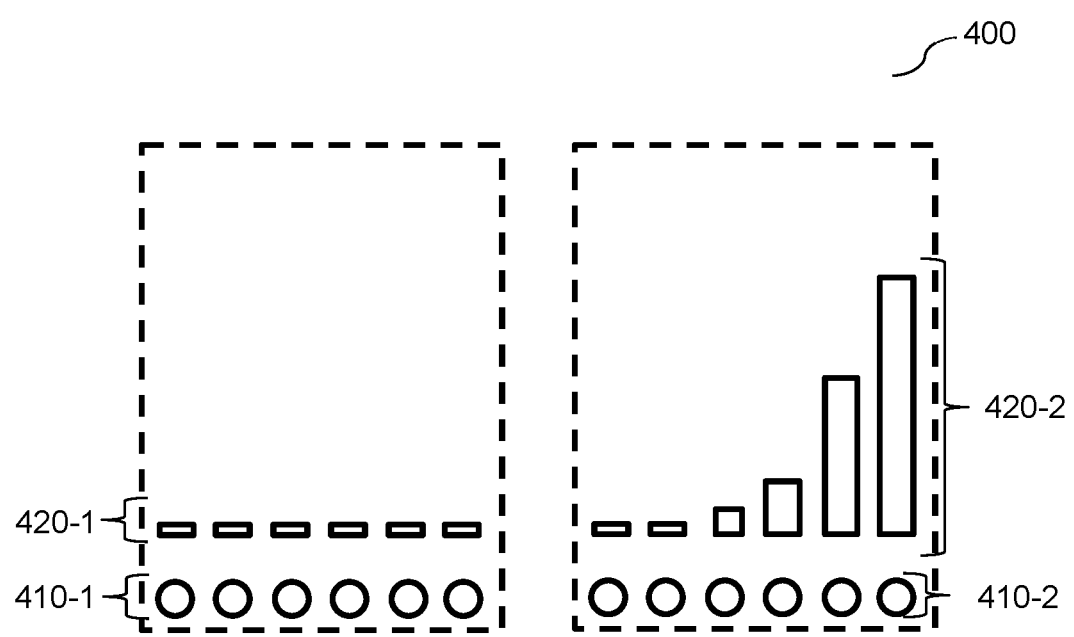
FIG. 4 is a diagram illustrating an example ordered list of knobs.

FIG. 4 is an example diagram 400 illustrating an example visual illustration of an ordered list of knobs. In the diagram 400, the ordered list of knobs is composed of two portions: a first portion 410-1, and a second portion 410-2. The impact of each knob on the target metric is represented by a respective bar such that the impacts of the knobs of the first portion 410-1 are represented by a first group of bars 420-1 and the impacts of the knobs of the second portion 410-2 are represented by a second group of bars 420-2. Each bar may be generated based on, but not limited to, a score determined as described herein. Such scores allow for ranking knobs based on relative effect on the target metric.

As depicted in the example diagram 400, the first group of bars 420-1 includes bars associated with respective knobs of the knobs 410-1 which have the lowest impact on the target metric. The second group of bars 420-2 include bars associated with respective knobs of the knobs 410-2 which have the highest impact on the target metric. In accordance with various disclosed embodiments, a test configuration for a system including the knobs 410-1 and 410-2 would include reconfiguring the knobs 410-2 according to a potentially optimized configuration while the knobs 410-1 remain at their baseline values.

It should be noted that two equal portions of knobs 410-1 and 410-2 are depicted in FIG. 4 merely for example purposes, but that other distributions of knobs may be equally utilized for testing purposes in accordance with the disclosed embodiments. In some implementations, the second portion 410-2 may include a single knob such that the target metric measurements are compared between a control group and a test group including only a single reconfigured knob, thereby allowing for testing each knob in the second portion 410-2 individually.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
    determining an ordered list of system parameters for a system based on a plurality of historical sets of target metric measurements related to a target metric, wherein the ordered list of system parameters is organized with respect to impact on the target metric;
    determining, by a processor, a second system configuration based on the ordered list of system parameters and a first set of target metric measurements, wherein the first set of target metric measurements is recorded for the system when the system is configured according to a first system configuration, wherein the first system configuration defines a configuration for each of the plurality of system parameters, wherein the second system configuration includes at least one system parameter of the plurality of system parameters that is reconfigured as compared to the first system configuration;
    applying one of the first system configuration and the second system configuration, wherein the applied system configuration is determined based on the first set of target metric measurements and a second set of target metric measurements, wherein the second set of target metric measurements is recorded for the system when the system is configured according to the second system configuration;
    determining a second ordered list of system parameters;
    determining a third system configuration based on the second ordered list of system parameters;
    applying one of the first applied system configuration and a third system configuration as a second applied system configuration, wherein the second applied system configuration is determined based on a third set of target metric measurements and the set of target metric measurements of the first applied system configuration, wherein the third set of target metric measurements is recorded when the system is configured according to the third system configuration.

2. The method of claim 1, further comprising:
    iteratively recording first and second sets of target metric measurements during a plurality of iterations, wherein a new system configuration to be applied is determined at each iteration of the plurality of iterations.

3. The method of claim 1, further comprising:
    ranking the plurality of system parameters with respect to a relative impact of each of the plurality of system parameters on the target metric, wherein the ordered list of system parameters is determined based on the ranking of the plurality of system parameters.

4. The method of claim 3, wherein ranking the plurality of system parameters further comprises:
    determining a sorted array of pairs, wherein each pair of the sorted array of pairs includes a system parameters configuration for the plurality of system parameters and an associated target metric measurement for the system parameters configuration, wherein the sorted array of pairs is sorted with respect to the target metric measurement of each of the pairs.

5. The method of claim 4, further comprising:
assigning at least one penalty score to each of at least one system parameter of the plurality of system parameters based on the sorted array of pairs, wherein each of the plurality of system parameters is ranked based further on the assigned penalty scores.

6. The method of claim 1, further comprising:
checking whether a set of historic target metric measurements for the system configured according to the second system configuration is stored in a database, wherein the second set of target metric measurements is the set of historic target metric measurements when the set of historic target metric measurements for the system configured according to the second system configuration is stored in the database.

7. The method of claim 6, further comprising:
recording the second set of target metric measurements for the system when the system is configured according to the second system configuration, when the set of historic target metric measurements for the system configured according to the second system configuration is not stored in the database.

8. The method of claim 1, wherein the plurality of system parameters includes at least one of: hardware configuration parameters, processor configuration parameters, firmware configuration parameters, operating system configuration parameters, application configuration parameters, compiler flags, virtual machine configuration parameters, container configuration parameters, orchestration configuration parameters, and data center configuration parameters.

9. The method of claim 1, wherein the plurality of system parameters includes at least one of: parameters indicating whether to enable symmetric multithreading on CPUs, whether to enable CPU cache prefetchers, whether to use a specific version of CPU microcode, whether to limit the power states of a power management unit of a CPU, which TO scheduler to use in the OS, which task scheduler to use in the OS, the OS scheduler time interval, task affinities, the hardware timer event interval, the maximum network packet size, the maximum threads a web server software can spawn, the voltage and frequency of a core, which compiler flags to use for building the binaries, which container sizes to use, and whether to enable or disable certain software performance features.

10. A non-transitory computer readable medium having stored thereon instructions for causing a processing circuitry to execute a process, the process comprising:
determining an ordered list of system parameters for a system based on a plurality of historical sets of target metric measurements related to a target metric, wherein the ordered list of system parameters is organized with respect to impact on the target metric;
determining a second system configuration based on the ordered list of system parameters and a first set of target metric measurements, wherein the first set of target metric measurements is recorded for the system when the system is configured according to a first system configuration, wherein the first system configuration defines a configuration for each of the plurality of system parameters, wherein the second system configuration includes at least one system parameter of the plurality of system parameters that is reconfigured as compared to the first system configuration;
applying one of the first system configuration and the second system configuration, wherein the applied system configuration is determined based on the first set of target metric measurements and a second set of target metric measurements, wherein the second set of target metric measurements is recorded for the system when the system is configured according to the second system configuration;
checking whether a set of historic target metric measurements for the system configured according to the second system configuration is stored in a database, wherein the second set of target metric measurements is the set of historic target metric measurements when the set of historic target metric measurements for the system configured according to the second system configuration is stored in the database; and
recording the second set of target metric measurements for the system when the system is configured according to the second system configuration, when the set of historic target metric measurements for the system configured according to the second system configuration is not stored in the database.

11. The non-transitory computer readable medium of claim 10, wherein the plurality of system parameters includes at least one of: hardware configuration parameters, processor configuration parameters, firmware configuration parameters, operating system configuration parameters, application configuration parameters, compiler flags, virtual machine configuration parameters, container configuration parameters, orchestration configuration parameters, and data center configuration parameters.

12. The non-transitory computer readable medium of claim 10, wherein the plurality of system parameters includes at least one of: parameters indicating whether to enable symmetric multithreading on CPUs, whether to enable CPU cache prefetchers, whether to use a specific version of CPU microcode, whether to limit the power states of a power management unit of a CPU, which IO scheduler to use in the OS, which task scheduler to use in the OS, the OS scheduler time interval, task affinities, the hardware timer event interval, the maximum network packet size, the maximum threads a web server software can spawn, the voltage and frequency of a core, which compiler flags to use for building the binaries, which container sizes to use, and whether to enable or disable certain software performance features.

13. A machine comprising:
a processing circuitry; and
a memory, the memory containing instructions that, when executed by the processing circuitry, configure a system to:
determine an ordered list of system parameters for the system based on a plurality of historical sets of target metric measurements related to a target metric, wherein the ordered list of system parameters is organized with respect to impact on the target metric;
rank the plurality of system parameters with respect to a relative impact of each of the plurality of system parameters on the target metric, wherein the ordered list of system parameters is determined based on the ranking of the plurality of system Parameters;
determine a second system configuration based on the ordered list of system parameters and a first set of target metric measurements, wherein the first set of target metric measurements is recorded for the system when the system is configured according to a first system configuration, the system having a plurality of system parameters, wherein each system parameter is a system parameter of the system, wherein the first system configuration defines a configuration for each of the plurality of system parameters, wherein the second system configuration includes at least one system parameter of the plurality of system parameters that is reconfigured as compared to the first system configuration; and apply one of the first system configuration and the second system configuration, wherein the applied system configuration is determined based on the first set of target metric measurements and a second set of target metric measurements, wherein the second set of target metric measurements is recorded for the system when the system is configured according to the second system configuration.

14. The machine system of claim 13, wherein the system is further configured to:
iteratively record first and second sets of target metric measurements during a plurality of iterations, wherein a new system configuration to be applied is determined at each iteration of the plurality of iterations.

15. The machine of claim 13, wherein the system is further configured to:
determine a sorted array of pairs, wherein each pair of the sorted array of pairs includes a system parameters configuration for the plurality of system parameters and an associated target metric measurement for the system parameters configuration, wherein the sorted array of pairs is sorted with respect to the target metric measurement of each of the pairs.

16. The machine of claim 15, wherein the system is further configured to:
assign at least one penalty score to each of at least one system parameter of the plurality of system parameters based on the sorted array of pairs, wherein each of the plurality of system parameters is ranked based further on the assigned penalty scores.

17. The machine of claim 13, wherein the system is further configured to:
check whether a set of historic target metric measurements for the system configured according to the second system configuration is stored in a database, wherein the second set of target metric measurements is the set of historic target metric measurements when the set of historic target metric measurements for the system configured according to the second system configuration is stored in the database.

18. The machine of claim 17, wherein the system is further configured to:
record the second set of target metric measurements for the system when the system is configured according to the second system configuration, when the set of historic target metric measurements for the system configured according to the second system configuration is not stored in the database.

19. The machine of claim 13, wherein the plurality of system parameters includes at least one of: hardware configuration parameters, processor configuration parameters, firmware configuration parameters, operating system configuration parameters, application configuration parameters, compiler flags, virtual machine configuration parameters, container configuration parameters, orchestration configuration parameters, and data center configuration parameters.

20. The machine of claim 13, wherein the plurality of system parameters includes at least one of: parameters indicating whether to enable symmetric multithreading on CPUs, whether to enable CPU cache prefetchers, whether to use a specific version of CPU microcode, whether to limit the power states of a power management unit of a CPU, which IO scheduler to use in the OS, which task scheduler to use in the OS, the OS scheduler time interval, task affinities, the hardware timer event interval, the maximum network packet size, the maximum threads a web server software can spawn, the voltage and frequency of a core, which compiler flags to use for building the binaries, which container sizes to use, and whether to enable or disable certain software performance features.

* * * * *